May 15, 1956 — A. J. JANIK — 2,745,670
QUICK ACTING CHUCKING TOOL
Filed Oct. 19, 1953 — 4 Sheets-Sheet 1
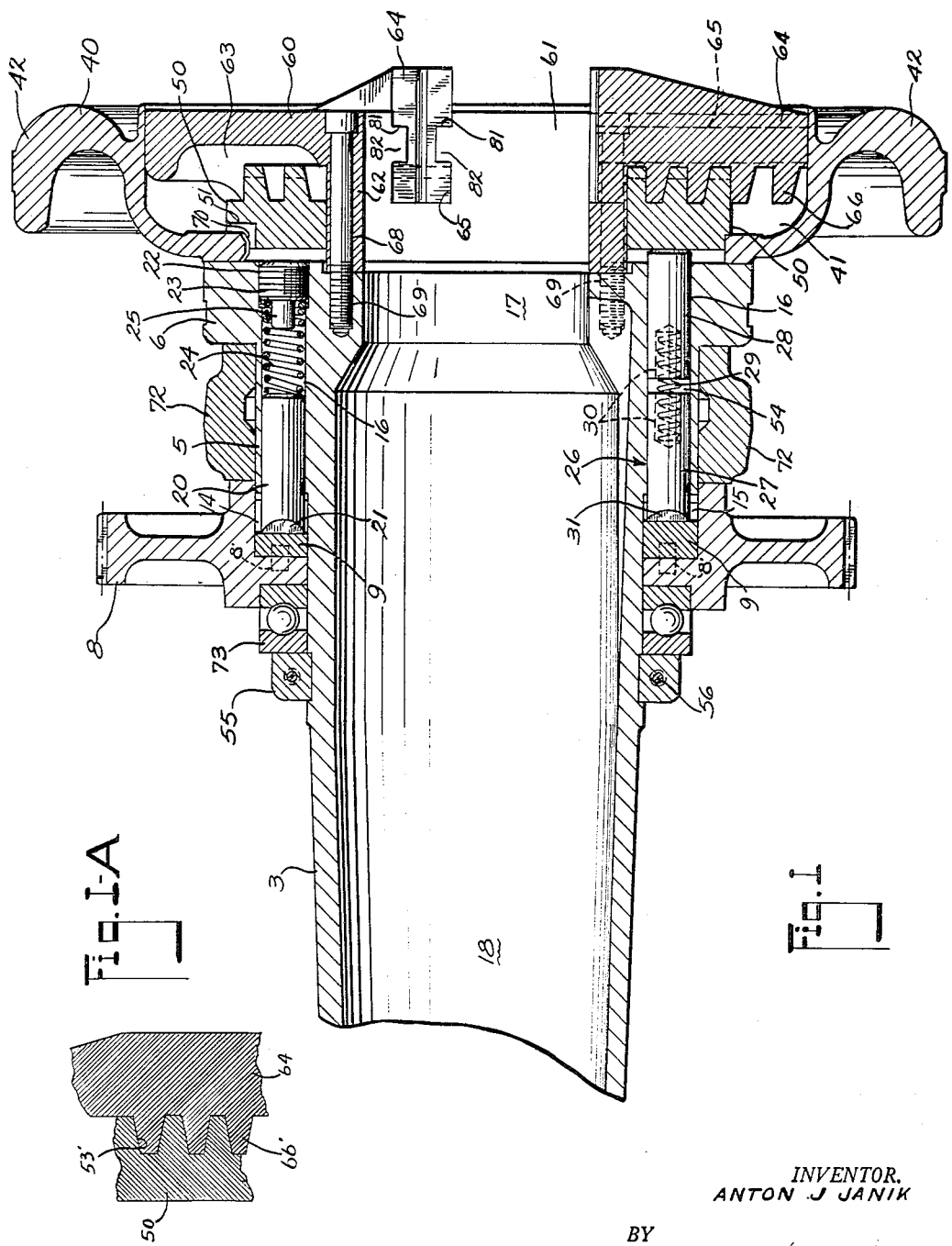
INVENTOR.
ANTON J JANIK
BY
HIS ATTORNEY May 15, 1956 A. J. JANIK 2,745,670
QUICK ACTING CHUCKING TOOL
Filed Oct. 19, 1953 4 Sheets-Sheet 2
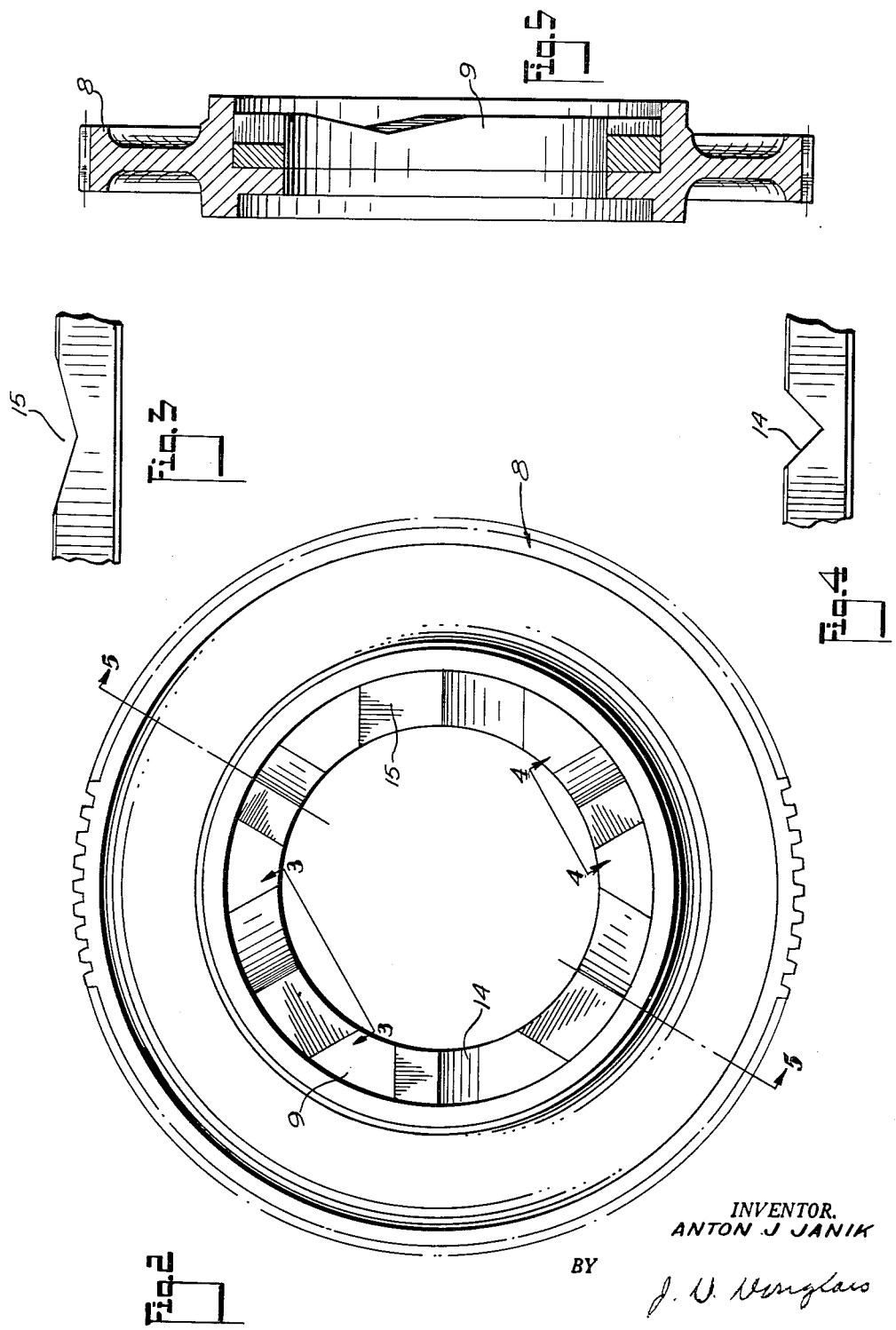
INVENTOR.
ANTON J JANIK
BY
J. D. Douglass
HIS ATTORNEY

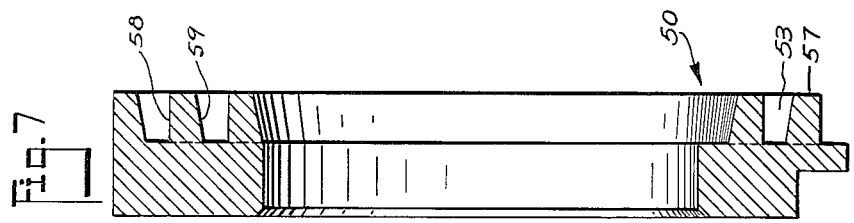
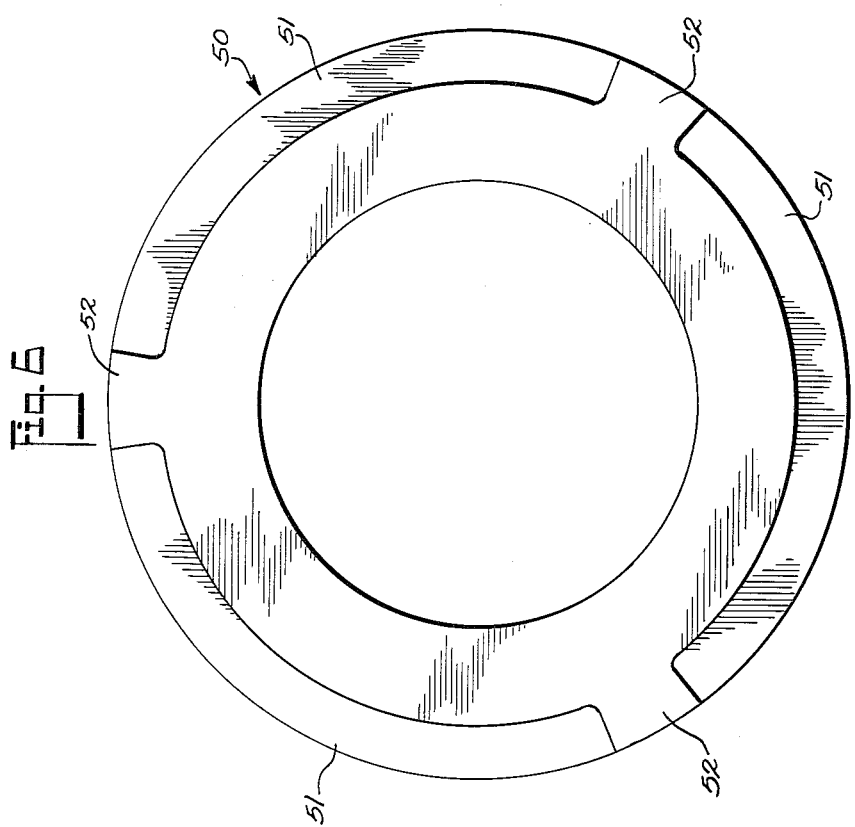

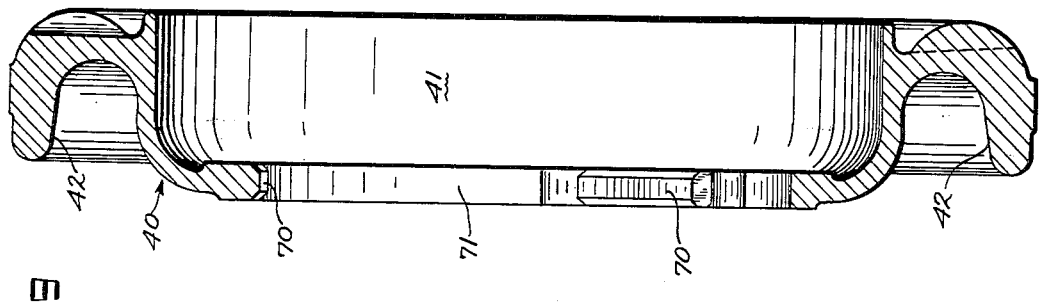
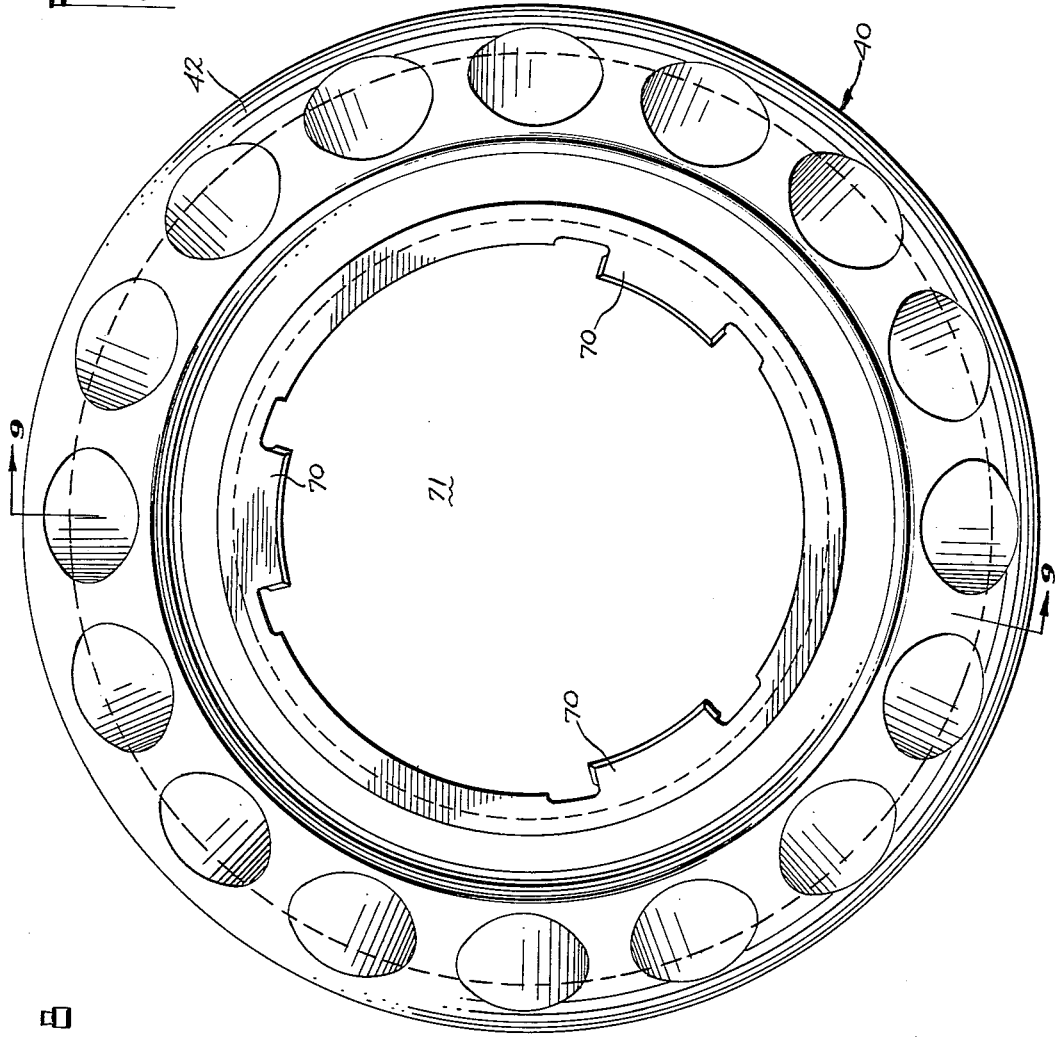

United States Patent Office 2,745,670
Patented May 15, 1956

2,745,670
QUICK ACTING CHUCKING TOOL

Anton J. Janik, Elyria, Ohio, assignor to The Ridge Tool Company, Elyria, Ohio

Application October 19, 1953, Serial No. 386,814

24 Claims. (Cl. 279—114)

This invention relates to chucking devices for holding cylindrical pipe or like bodies, while work is performed thereon, and more particularly to improvements in hand operated chucking devices having a self-tightening action.

Heretofore in the usual type of chuck used, the work piece was inserted into the device and secured therein by means of a plurality of jaws or a collet forced along the axis of the chuck and engaging the outer surface of the work piece. The manual power to force the jaws toward the axis of the chuck is usually applied by means of a chuck wrench or similar tool. Very often the operator fails to remove the wrench, after the restraining operation is completed, and as a result injuries to the operator or others in proximity to the device are sustained when the machine to which the chuck is attached is put into operation and the wrench flies out.

Another problem paramount to those persons who are engaged in the various occupations which have need for such a device is the high ratio of scrap material produced, partially due to the low efficiency of the holding mechanism of the chuck since it is realized that if the manual force applied is not of sufficient magnitude the pipe will come loose during the rotation of the chuck, and also because of the resistive force applied by the cutting tool tends to loosen the pipe in the chuck. The device of the persent invention, by a combination of manually and automatically applied forces to secure the work piece, has provided a means by which a decided increase in both quantity and quality of production is accomplished, and also a more safe and versatile device is realized.

Another advantage of my invention resides in the fact that regardless of the rotational motion of the primary power source, my device is equally efficient to close the chuck in either direction of rotation.

Still further advantages of the invention will be realized by those familiar with the art and a more thorough understanding will be realized by reference to the accompanying description of an embodiment thereof, which description is illustrated by the drawings herein and included as a part of this specification.

In the drawings:

Fig. 1 is a vertical section of the chucking device embodying the invention;

Fig. 1A is a fragmentary sectional view showing the scroll plate and chuck jaw in mesh;

Fig. 2 is a plan view of the driving gear and pressure plate;

Fig. 3 is a sectional view taken along lines 3—3 of Fig. 2 showing the configuration of one of the driving grooves;

Fig. 4 is a sectional view taken along lines 4—4 of Fig. 2 showing the configuration of one of the centering grooves;

Fig. 5 is a vertical sectional view of the driving gear and pressure plate taken along lines 5—5 of Fig. 2;

Fig. 6 is a plan view of the scroll plate;

Fig. 7 is a vertical sectional view of the scroll plate;

Fig. 8 is a plan view of the hand wheel showing the lugs about the periphery of the center hole;

Fig. 9 is a vertical sectional view of the hand wheel.

Briefly the invention contemplates a chuck having moveable jaws operated by a scroll plate. The scroll plate may partake of a movement relative to the jaws such that the land in the scroll plate moves away from complete meshing engagement with the teeth in the jaws. Means is provided for translating torque necessary to a cutting operation into a movement of the scroll plate so that the land more completely meshes with the teeth in the jaws and the relationship between the land, and the jaw teeth is such that, as a more complete meshing is effected, a greater inward or chucking force is applied to the jaws.

Referring now to the drawings in which like elements are designated by like reference characters, a hollow shaft 3 having a cylindrical portion at one end, Fig. 1, a round flange 6, and juxtaposed to the flange portion of reduced diameter providing a bearing surface 5, serves as a foundation upon which the components comprising the invention are located. A driving gear 8, Fig. 2, having a central portion removed therefrom and into which a pressure or cam plate 9 is inserted and rigidly secured thereto by studs 8' is placed onto the shaft adjacent the bearing surface 5 and is revolvable over the shaft surface. The embodiment shows the gear and plate as comprising two separate elements but it is to be understood they can be produced as one integral unit.

A plurality of radially extending V-shaped grooves, or cam faces being in spaced relation to each other, are formed about an inscribed radius on the face of the pressure plate 9. Alternate cam faces are adapted to function as centering cams 14, Figs. 2 and 4, while the remaining function as driving cams 15, Figs. 2 and 3. The function of said cam faces will be explained in detail hereinafter.

As will be apparent, although I have shown the cams as groups of three it is possible and practicable to use two cams to a group, or more than this may be used in a group. It is also possible to only use one such cam although it is not as desirable as two or more.

A plurality of holes or bores 16, Fig. 1, are drilled in the flange of the shaft 3; they extend longitudinally into and through the bearing surface portion, and terminate in the space adjacent to the cam plate. The holes are located so that their centers are in the same circumferential plane as the V-shaped cams, when said plate gear is mounted on the shaft.

Round centering pins 20 each having a wedge shaped point 21, are disposed alternately in the holes 16, and extend into the V-shaped centering cams 14 on the pressure plate; the wedge shaped point being complementary to the V-shaped centering cam. The holes on the flange end 22 are threaded a sufficient distance to enable a hollow headed screw 23 to be placed therein. A spring 24 is placed in each hole between the pin and cap screw. A stem 25 on the screw 23 extends into the spring to prevent the spring from buckling as the screw is rotated clockwise to provide a predetermined force of the pin upon the pressure plate.

A composite driving pin 26 comprised of a head part 27 and a tail part 28 with a spring 29 interposed between them, and being seated within blind holes 30 drilled into each of the inside faces of each part, is placed into each of the remaining alternate holes 16 in the flange and extend into and through the shaft with the head part seating into the driving cams 15 on the pressure plate. The front of the head part is formed into a wedge shaped point 31 conforming to the configuration of the V-shaped driving cam.

A circular hand wheel 40, Figs. 1 and 8, having a concave bowl-like central portion 41, and a hand gripping periphery 42 is provided for manually adjusting the holding mechanism of the device. The bowl-like central portion houses a scroll plate 50, Figs. 1 and 6, and a jaw head or cap 60, containing movable jaws 64.

The body of the jaw head or cap is generally disk shaped and has a central hub 62, Fig. 1. A circumferential groove 63 substantially rectangular in cross section is formed on the back face defining the periphery of the hub and extends outward toward the periphery of the cap. A bore 61 is located in the center of the hub, and is of the same size as the bore 17 extending through the flange portion of the shaft. Three radially extending slots or channels 65 in spaced relation to each other, are formed in the disk shaped body of the jaw head and extend from the bore in the hub to the periphery of said jaw head; the radial slots open into the circumferential groove.

Jaws 64 are positioned within each of the radial slots, being slidable therein. The embodiment of Fig. 1 shows the jaws being held in the radial slots by a combination of grooves 81 formed on the jaws that are adapted to embrace tongues 82 formed on the walls of the radial slots 65. This provides an accepted tongue and groove mounting for the jaws which is merely one way of slidably mounting the jaws, others being well known to those versed in the art. The side of each jaw, extending into the opening common to the radial slots and circumferential groove, is formed with a series of teeth 66 thereon and is generally in the form of an Acme type of thread construction. The flank of each of the teeth facing toward the axis of the device is parallel to the axis of the chuck instead of the usual sloping characteristic of the Acme type of design, while the outward facing slides are slanting as is usual. The function of said jaws and the reason for the peculiar configuration of said teeth will be explained in detail hereinafter.

A disk shaped scroll plate 50, Figs. 1, 6 and 7, is located within the concave bowl-like portion of the hand wheel, and has a plurality of indentations formed about the edge of the face adjacent the inside wall of the hand wheel thereby defining depressions 51 and tongues 52 in spaced relation.

A spiral groove 53 (Figs. 1 and 7) is formed on the opposite face of the plate defining a spiral land 57. One side surface 58 of the spiral land is formed so as to be parallel with the axis of the device while the other surface 59 diverges outwardly from the axis toward the jaw head 60.

The teeth of the movable clamping jaws 61 are adapted to be in the spiral groove, and upon either a manual rotational force applied to the scroll plate by the hand wheel or a rectilinear force applied by the drive pins, the spiral land and disposed teeth cooperate to move the clamping jaws radially inward in their restrictive channels.

The scroll plate and jaws are shown with the lands and teeth being perpendicular on one side and slanting on the other side; it is contemplated that these teeth might be slanting on both sides. This would be particularly desirable in event the chuck was to be used for inside as well as outside holding of a work piece. The resultant construction and meshing of the spiral land 53' and jaw teeth 66' having slanting sides is shown in Fig. 1A.

Lugs 70, Fig. 8, are formed on the inner edge of the center hole 71 of the hand wheel in spaced relation to each other and extend toward the axis of the wheel; the lugs are adapted to be disposed in the depressions 51 formed on the scroll plate and to engage the tongues 52.

A plurality of holes 68 located in the hub of the jaw head, and an extension 69 of said holes being threaded and located on the flange portion of the shaft, provide a means for securing the hand wheel, with the scroll plate and jaw head housed therein, to the shaft. The hub is of sufficient depth to prevent the hand wheel from being pressed against the flange and this allows said wheel to be oscillated freely over the outside surface of the jaw head.

A bracket 72 provides a means for securing the chucking device to the machine and is positioned over the bearing surface 5 on the exterior surface of the shaft. A ring thrust bearing 73 is positioned adjacent the driving gear with one side of the bearing partially encased within the driving gear. A split ring type of locking member 55 is adapted to be placed over the exterior surface of the shaft adjacent the ring bearing 73 and thereat resiliently secured by means of two cap screws 56 to lock the driving gear and ring bearing in place thereby preventing these members from traveling longitudinally over the surface of the shaft. This bearing could be a plain bearing but a ball bearing is desirable because it facilitates the free movement of the parts.

In operation, a section of cylindrical pipe or like body is inserted into and through the central hole 18 of the shaft with the portion on which the work is to be performed extending outward from the jaw head; Fig. 1 showing the chucking device in its no load rest position prior to any securing of the pipe to the chuck. The composite driving pins 26 are shown as forcing the scroll plate 50 toward the jaws 64 resulting in maximum engagement between the teeth and lands of these two elements.

The hand wheel 40 is then rotated in a counterclockwise direction or toward the operator when he is in position before the machine with the chucking device to his right. The lugs 70 formed on the inner edge of the center hole of the wheel strike against the tongues 52 on the face of the scroll plate 50, and rotate the plate about the hub 62 of the jaw head 60. As the scroll plate is rotated, the inclined contacting surfaces of the spiral land and chuck jaws force the jaws to move radially inward, in their restrictive channels, toward the work piece. Rotation of the hand wheel is continued until the jaws come into contact with the outside surface of the work piece whereby further rotational movement is resisted by the pressure exerted on the jaws by the surface of the piece. The pressure between the scroll plate and the jaws results in a surface reaction between the slanted contacting surfaces of the spiral land and chuck jaws, the slanting surfaces causing the scroll plate to be forced to move longitudinally to the left over the hub away from the jaws. This causes a gap between the ends of the land and jaw teeth, which at this time are not completely meshed. The scroll plate moving over the hub 62 of the jaw head 60 toward the flange 6 on the barrel shaft 3 forces the rear section 28 of each driving pin 26 into engagement with the front section 27 thereby compressing spring 29 and eliminating the gap 54 between the two sections of the pin. The relationship between the spiral groove and jaw teeth are shown by dotted lines in Fig. 1 when the scroll plate is against the flange. The hand wheel being free to move within the limits of the depressions on the scroll plate without disturbing the radial position of the jaws is then rotated clockwise a slight degree and then rapidly again counterclockwise, the lugs striking the edge of the tongues with sufficient force with hammerlike blows, which minutely rotates the plate, thereby exerting an additional pressure on the jaws causing them to grasp the pipe more firmly. This rotational hammering procedure can be repeated until no additional inward movement of the jaws can be obtained by this means.

The primary function of the centering pins is to reestablish the relationship that prevails between the driving source and shaft prior to the application of the cutting tool for when the load is removed from the pipe the springs 24 react to press the pins into complete engagement with the centering grooves and thereby re-align the driving pins with the center of the driving grooves.

A source of motive power (not shown) which is coupled to the chucking device by means of the driving gear 8 is adapted to provide the necessary rotational motion for the device. The driving gear rotates about the shaft, and motion is transferred to the shaft by means of the driving pins seated within the cam faces located on the face of the pressure plate 9.

The driving pins are likewise positioned within the center of the driving grooves, the scroll plate having forced the rear portion 28 of each pin 26 forward into its retaining hole thereby compressing the spring 29 and increasing the force which the front portion 27 of each pin exerts upon the pressure plate. The pressure is of such magnitude that a sufficient degree of coupling from the cam faces to their pins is realized whereby the rotational movement of the gear is transferred from the cam plate to the pins and then to the shaft.

When a cutting tool such as a pipe threading device is applied to the end of the pipe to perform work thereon, a resistance to the rotational power source is at once realized, which said source tends to overcome. As a result of the variable power requirements, the turning moment or torque developed within the driving gear 8 is directly related to the force applied to the gear by said power source. Therefore, the forces operating on the centering and driving pins are changeable in a direct proportion to the load applied to the work piece. As the cutting tool is applied, the shaft tends to lag with respect to the drive gear, and the resistive force is transmitted to the gear by means of the driving pins. An analysis of the resultant force operating normally to the contacting surfaces of the grooves and pins shows that there is present a component which tends to sustain rotative motion, and a component whose direction is along the longitudinal axis of the drive pins and toward the jaw head.

The driving pins each now acting as an integral unit, are forced toward the jaw head and laterally push the scroll plate into more complete engagement with the movable jaws, and due to the inclination of the contacting surfaces of the spiral land and jaws, the jaws are forced toward the axis of the chucking device and thereby grasp the work piece more firmly by a very marked degree.

The embodiment shows that the pressure plate grooves and the portion of each pin that extends into the grooves have a V-shaped construction, and said reason being, that for a predetermined direction of rotation only one face of the grooves and pins are operated upon by the several forces resulting from work performed on the cylindrical pipe. It is realized that if the direction of rotation of the drive unit was reversed, the opposite edges of the grooves and pins would function to provide the same result described above. Therefore, the structural and operational characteristics of this device provide a chucking tool that is adapted to operate effectively notwithstanding the rotational motion of the power source permitting the same inward gripping action of jaws in either direction of rotation, thus permitting operation of the device for cutting either right or left hand threads.

When the work on the pipe is completed, and the operator wishes to remove the work piece from the chuck, the cutting tool is removed from the work piece. The driving pins 26 remain pressed against the upper portion of the slanting surface of the driving grooves 15 due to the presence of frictional forces acting upon the jaws 64, scroll plate 50, and pressure plate 9. The scroll plate 50 is held in its operative position with the jaw teeth 66 being in partial engagement with the spiral groove 53 until an additional force, acting adversely to the frictional forces, upsets the equilibrium between the above members.

This force is obtained through use of the hand wheel 40 which is rotated clockwise or away from the operator whereby the lugs 70 strike against the tongues 52 on the scroll plate 50. The rotational movement of the scroll plate forces the jaws 64 to move radially outward from the work piece, and the relationship between the jaw teeth 66 and the spiral groove 53 is thereby changed. As the jaws 64 move outward, the teeth 66 become aligned with the spiral groove 53 whereby the scroll plate 50 is capable of further longitudinal movement toward the jaw head 60 and into complete mesh with the jaw teeth 66. The spring 29 between the head and tail part of each driving pin 26 expands forcing the tail part 28 to press the scroll plate 50 into complete mesh with the jaws 64. As the scroll plate 50 moves toward the jaw head 60, the spring 24 of each centering pin 20 is of sufficient resiliency to seat the centering pins within the centering grooves 14, and thereby re-align the drive gear 8 and disposed pressure plate 9 with the barrel 3 and driving pins 26 carried therein, as depicted in Fig. 1, thereby enabling the driving pins 26 to seat in the center of the driving grooves 15.

The rotation of the hand wheel is continued until the jaws 64 have moved away from the work piece a distance sufficient to allow the operator to remove the piece from the chuck, and to prepare the device for subsequent operation.

It will be apparent that the centering pins 20 perform the function, due to the more acute angle of the cam 14, of centering the cam faces with the drive pins. It is apparent however that the drive pins 26 themselves assist in this centering action. It is therefore within the purview of my invention to utilize the drive pins without the centering pins in some instances. In the last mentioned case it might be desirable to slightly increase the angularity of the cams 15 to provide a more positive centering action.

It will thus be seen that the operation of the hand wheel causes the scroll plate and its jaw controlling land to move away from the jaw teeth decreasing the degree of mesh between the land and the teeth and conditioning the apparatus for the subsequent movement of the scroll plate into more complete mesh with the jaw teeth and resultant further closing of the jaws. It is also seen that a rotational force or torque applies a rotational force to the jaws and also a longitudinal force to the scroll plate which force is in turn translated to a radial force on the jaws.

Having thus described my invention I am aware that numerous and extensive departures may be made therefrom without departure from the spirit of the invention which is defined in the appended claims.

I claim:

1. In a chucking tool for holding a workpiece having a spindle, means for securing said workpiece to said tool comprising a scroll plate and chuck jaws, a spiral land on said scroll plate, a plurality of teeth on said jaws, said teeth being in intermeshing engagement with said spiral land, the teeth and land provided with faces inclined relative to the axis on at least one side, said scroll plate being mounted for longitudinal axial movement relative to the jaws where upon rotation of said scroll plate said jaws move radially toward said workpiece to secure said workpiece in said chucking tool.

2. In a chucking tool for holding a workpiece having a spindle, means for securing said workpiece in said tool comprising a scroll plate and chuck jaws, a spiral land on said scroll plate and a plurality of teeth on said jaws in interlocking engagement with said spiral land, said faces of said teeth being parallel to the axis of the chuck on one side and the other side being inclined and diverging away from said axis, mounting means for said scroll plate permitting longitudinal axial movement thereof relative to the jaws whereby upon rotation of said scroll plate said jaws move radially toward said workpiece to secure said workpiece in said chucking tool.

3. In a work holding chuck having a centrally located spindle, means for securing a workpiece to said chuck, comprising a scroll plate and chuck jaws in engagement therewith, said scroll plate having a spiral land, and teeth on said jaws engaging said land, in intermeshing engagement therewith, the teeth and land provided with faces inclined relative to the axis of the chuck on at least one side, a plurality of depressions and tongues on said scroll plate opposite to said spiral land, a hand wheel member, an opening in said wheel member, lugs formed peripherally about said opening, said wheel member and said scroll plate being mounted for axial movement relative to said jaws, mounting means for said scroll plate permitting longitudinal axial movement thereof relative to the jaws and wheel member, said lugs on said wheel member engaging said depressions and tongues of said scroll plate whereby rotating said wheel member said scroll plate is rotated forcing said jaws radially toward said workpiece to secure said workpiece in said chucking tool.

4. In a chuck tool for holding a workpiece including a centrally located spindle, means for securing said workpiece to said chucking tool including a scroll plate, a face plate having movable jaws disposed therein, said scroll plate having a spiral land, and teeth on said jaws engaging and being in interlocking engagement with said land, said interlocking faces on said teeth and land being disposed in angular relation relative to the axis of the chuck on at least one side, a plurality of depressions and tongues on said scroll plate on the face opposite to said land, said face plate having first and second bearing surfaces, a hand wheel member having a hole through the central portion, a plurality of lugs formed peripherally about said hole, said lugs on said wheel member engaging said depressions and tongues on said scroll plate, said scroll plate being mounted for axial movement relative to said jaws on said first mentioned bearing surface and said wheel member being mounted on said second mentioned bearing surface, said wheel member adapted to be rotated about said second mentioned bearing surface driving said scroll plate whereby said jaws are moved radially toward said workpiece to secure said workpiece in said chucking tool.

5. In a chucking tool of the class described including a spindle, drive means adapted to provide rotatable motion for said tool rotatably mounted on said spindle, means for securing a workpiece in said tool including a face plate carried by the spindle and a plurality of movable jaws radially disposed therein, means for manually moving said jaws to engage said workpiece comprising a hub on said face plate, a scroll plate rotatable and slidably journalled on the hub, a hand wheel member juxtaposed to and engageable with said plate, a plurality of teeth on said movable jaws, a spiral land on said scroll plate engaged with said teeth, slidable pin means engageable with said scroll plate and arranged to press said land on the scroll plate into more complete mesh with the teeth on said jaw members, means interconnecting the scroll plate to said hand wheel for rotating the scroll plate whereby said scroll plate travels longitudinally over said hub away from said jaw members substantially changing the relationship between said plate, jaw members, and pin means, said jaw members arranged to move toward the axis of said tool securing the workpiece disposed therein as said hand wheel is turned about the axis of said tool.

6. In a chucking tool for holding a workpiece including a spindle, means for securing said workpiece in said chucking tool comprising a scroll plate, a face plate having movable jaws disposed therein, said scroll plate having a spiral land, and teeth on said jaws engaging said land in intermeshing engagement therewith, said intermeshing faces on said teeth and land being parallel to the axis of the chuck on one side and inclined and diverging away from said axis on the other side, a plurality of depressions and tongues of said scroll plate on the face opposite to said spiral groove, a hub on said face plate, a bearing surface on the periphery of said hub, a second bearing surface on the periphery of said face plate, a hand wheel member having a hole through the central portion, a plurality of lugs formed peripherally about said hole, said lugs on said wheel member engaging said tongues on said scroll plate, said scroll plate being mounted on said first mentioned bearing surface for axial movement relative to said jaws and said wheel member being mounted on said second mentioned bearing surface for reciprocatory axial movement relative to said jaws and adapted to provide a hammering action to axially drive said scroll plate and radially move said movable jaws to secure said workpiece in said chucking tool.

7. In a chucking device for holding a workpiece including a spindle, a head portion on one end of said spindle, a scroll plate, chuck jaws in engagement with said scroll plate adapted to secure said workpiece in said chucking device, means for providing rotative motion to said device comprising; a drive member, a cam surface on the drive member, pin means in engagement with said cam surface and head portion of said spindle providing a coupling means between said drive member and spindle and enabling said drive member to rotatably drive said chucking device.

8. In a chucking device for holding a workpiece including a spindle having a head portion on one end, a scroll plate, chuck jaws in engagement with said scroll plate adapted to secure said workpiece, means for providing rotative motion to said device comprising; a drive member rotatably disposed on the spindle and having a cam surface, pin means slidably journalled in said head portion of said spindle engaging said cam surface to provide coupling means between said drive member and spindle and enabling said drive member to rotatably drive said chucking device.

9. A work holding chuck including a spindle having a head portion on one end, a scroll plate, chuck jaws in engagement with said scroll plate arranged to secure said workpiece, means for providing rotative motion to said device comprising, a drive member rotatably disposed on the spindle and having a cam plate member disposed within a recess therein, said drive member and cam plate being rotatable as a unit on said spindle, a plurality of V-shaped cam surfaces on said cam plate, said cam surfaces being in radial spaced relation about the axis of the spindle, pin means having wedge shaped cam surfaces engaging said cam plate surfaces and slidably journalled in said head portion of said spindle to provide a coupling between said drive member and spindle and enabling said drive member to rotatably drive said spindle.

10. A chuck of the class described including a spindle having a head portion on one end, a scroll plate, chuck jaws in engagement with said scroll plate arranged to secure said workpiece, means provided to aid said scroll plate in moving said jaws and also to provide coupling means to rotatably drive said device comprising, a drive member having at least one cam surface, a bearing member secured to said gear member, said drive member being rotatably journalled on said spindle, a plurality of V-shaped cam surfaces on said drive member in radial spaced relation, pin means having wedge shaped cam engaging surfaces engaging said cam surfaces disposed in said head portion of said spindle providing coupling means between said drive member and spindle, additional pin means in engagement with said drive member and adapted to be moved longitudinally relative to the axis of said device by said cam surfaces whereby said pin means engages said scroll plate to force said scroll plate into engagement with said jaws and thereby radially move said jaws toward said workpiece.

11. A chucking device as described for holding a workpiece including a spindle having a head portion on one end, a scroll plate rotatably and slidably journalled on said spindle, chuck jaws in engagement with said scroll plate arranged to secure said workpiece in said chucking device, means provided to aid said scroll plate in moving said jaws and also to provide coupling means to rotatably drive said device including a drive member, a cam plate surface on said drive member, said drive member being rotatably journalled on said spindle, at least one V-shaped cam surface on said drive member, pin means having wedge shaped surfaces engaging said cam surface journalled in said head and abutting said scroll plate and adapted to be moved longitudinally relative to the axis of said device by said cam surfaces whereby said pin means engages said scroll plate to force said scroll plate into engagement with said jaws and thereby radially move said jaws toward said workpiece.

12. A chucking device for holding a workpiece having an elongated barrel type spindle, a drive member adapted to provide rotatable motion for said spindle rotatably journalled therein, a bracket member slidably attached to said spindle for securing said device to a machine, a face plate member having a plurality of movable jaws in spaced relation and radially disposed therein, means to move said jaws toward said workpiece comprising, a scroll plate, a spiral land on one surface of said scroll plate, a plurality of teeth formed on said jaw members and engaged with said spiral land, a plurality of depression and tongues formed about the edge of one surface of said scroll plate opposite to the surface containing said spiral land, a hand wheel member having a centrally located hole, at least one lug formed about the periphery of said hole on said wheel member and arranged to extend into said depressions on said scroll plate member, whereupon rotation to engage said lug with the tongues on said scroll plate producing a resultant force acting upon the contacting surfaces of said spiral groove and teeth of said movable jaws, forcing said scroll plate to rotate, said force having a component to move said jaws toward said workpiece, a second component of said force to move said scroll plate longitudinally away from said face plate, a plurality of cam surfaces spaced radially on said drive member, a plurality of a second type of cam surface interspaced between said first mentioned surfaces and upon the same radius thereof, pin means disposed within said first mentioned cam surfaces, pin means disposed within second mentioned cam surfaces, said pin means disposed in said second mentioned cam surfaces adapted to be operated upon by said longitudinal movement of said scroll plate to force said pin means into more complete engagement with said drive member and thereby provide additional coupling means between said drive member and said shaft member to rotatably drive said chucking device.

13. In a chucking tool for holding a workpiece having a centrally located barrel type spindle, a flange on one end of said spindle, a drive member mounted on said spindle member and adapted to provide means for rotatable motion for said spindle, a bracket member mounted on the outer periphery of said spindle member and adapted to provide means for securing said tool to a machine such as a lathe, a face plate member having a plurality of radially spaced movable jaw members disposed therein for securing said workpiece to said chucking tool, means adapted to move said jaw members toward and into resilient engagement with said workpiece comprising; a disk shaped scroll plate, a spiral shaped groove on one surface of said scroll plate member defining a spiral land, a plurality of teeth formed on said movable jaws adapted to be engaged by said spiral shaped groove and land, a plurality of depressions and tongues formed about the edge of the surface of said scroll plate opposite the surface containing said spiral groove, a hand wheel member having a centrally located hole, a plurality of lugs formed on the periphery of said hole and adapted to extend into said depressions on said scroll plate member, whereupon rotation of said wheel said lugs strike against said tongues forcing said scroll plate to rotate producing a resultant force acting upon the contacting surfaces of said spiral groove, land and teeth of said jaws, said force having a component to move said jaws into engagement with said workpiece, a second component to move said scroll plate longitudinally away from said jaws, a plurality of cam surfaces spaced radially on said drive member, one or more of a second type of cam surface interspaced between said first mentioned cam surface, holes located in said flange portion of said shaft extending therethrough and opening adjacent said cam surfaces, pin means disposed within alternate holes and engaging said first mentioned cam surfaces, pin means disposed within the remainder of said holes and engaging said second mentioned cam surfaces, said pin means in said second mentioned cam surfaces comprising of a head part and a tail part, a spring interposed between said head and tail part of said pin means adapted to be operated upon by said longitudinal movement of said scroll plate whereby said tail part is forced through said hole toward said head part compressing said spring and thereby providing a greater degree of coupling between said drive member and shaft member to rotatably drive said chucking tool.

14. An apparatus of the class described including a spindle having an enlarged head on one end and a drive member rotatably journaled on the spindle adjacent the head and formed with a cam surface facing toward said head, a face plate secured to said head at the end thereof and chuck jaws slidably journalled therein, said face plate being formed with a reduced diameter portion on the side adjacent the spindle head to provide a space between the head and face plate, a scroll plate rotatably and slidably journaled on said reduced portion and having a land, teeth on said jaws engaged with said land, said teeth and land being provided with engaging faces that incline away from the axis of said device and arranged to decrease their meshing engagement with each other when the scroll plate is rotated to move the jaws into chucking engagement with a workpiece, means for rotating the scroll plate comprising a hand wheel rotatably journaled on the face plate and having a lost motion connection with the scroll plate, means slidably disposed in said head having one end for engagement with said cam surface and the other end extending through said head adjacent said scroll plate arranged to be moved longitudinally upon rotation of the cam, by the cam against the scroll plate and being of such a length that further movement on the cam is transmitted into rotary movement of the head.

15. An apparatus of the class described including a hollow spindle having an enlarged head on one end and a drive member rotatably journaled on the spindle adjacent the head and formed with a plurality of cam surfaces facing toward said head, a face plate secured to said head at the end thereof and chuck jaws slidably journaled therein, said face plate being formed with a reduced diameter portion on the side adjacent the spindle head to provide an annular recess between the head and face plate, a scroll plate rotatably and slidably journaled on said reduced portion and having a land, teeth on said jaws engaged with said land, said teeth and land being provided with engaging faces that incline away from the axis of said device and arranged to decrease their meshing engagement with each other, when the scroll plate is rotated to move the jaws into chucking engagement with a workpiece, means for rotating the scroll plate comprising a hand wheel rotatably journaled on the face plate and having a lost motion connection with the scroll plate, means for providing a driving and scroll plate moving connection between the drive member and the spindle comprising a member slidably disposed in said head having a wedge shaped end for engagement with said cam surface and the other end extending through said head into engageemnt with said scroll plate, said member arranged to be moved longitudinally by the cam against the scroll plate to force the scroll plate into more complete mesh with the jaws and being of such a length that further movement on the cam is transmitted into rotary movement of the head and spindle.

16. An apparatus of the class described including a hollow spindle having an enlarged head on one end and a drive member rotatably journaled on the spindle adjacent the head and formed with cam surfaces facing toward said head, means for holding said drive member against longitudinal movement on the spindle, a face plate secured to said head at the end thereof and chuck jaws slidably journaled therein, said face plate being formed with a reduced diameter portion on the side adjacent the spindle head to provide an annular recess between the head and face plate, a scroll plate rotatably and slidably journaled on said reduced portion and having a land, teeth on said jaws engaged with said land, said teeth and land being provided with engaging faces that incline away from the axis of said device and arranged to decrease their meshing engagement with each other when the scroll plate is rotated to move the jaws into chucking engagement with a workpiece, means for rotating the scroll plate comprising a hand wheel rotatably journaled on the face plate and having a lost motion connection with the scroll plate, pin means slidably disposed in said head having one end for engagement with and arranged to be reciprocated by said cam surface and the other end extending through said head into engagement with said scroll plate arranged to be moved longitudinally by the cam against the scroll plate, said pin comprising two separate portions having spring means engaging and holding said portions apart and in engagement with said cam and scroll plate, said pin parts being of such a length that when the spring is compressed and the parts are in abutting relationship the overall length is such that, with the scroll plate land fully meshed with the jaw teeth, it cannot ride beyond the high point of said cam whereby the further rotary movement of the cam is transmitted by the pin to rotate said spindle.

17. A device of the class described including a rotatable plate having chuck jaws movable therein for gripping a work piece, a scroll plate having a land cooperating with teeth on said chuck jaws and movable toward and away from the chuck jaws, said cooperating land and teeth being formed to cause a movement of the scroll plate away from the jaws upon the application of force to the jaws by the scroll plate and upon the chucking movement of the jaws meeting with resistance due to their chucking action, means for rotating said face plate arranged to cause a movement of scroll plate toward the jaws, and a resultant increased gripping action of the jaws on the work piece, and into a torque movement for rotating the face plate.

18. A device of the class described including a rotatable plate having chuck jaws movable therein for gripping a workpiece, a scroll plate having a land cooperating with teeth on said chuck jaws, said cooperating land and teeth being formed to cause a movement of the scroll plate away from the jaws upon the application of force to the jaws by the scroll plate and upon the chucking movement of the jaws meeting with resistance due to their chucking action, means for rotating said face plate and jaws arranged to first cause a movement of scroll plate toward the jaws and a resultant increased gripping action of the jaws on the work piece and second upon a predetermined resistance to further gripping movement of the jaws into a torque movement for rotating the face plate.

19. In a chucking tool of the class described including a spindle, drive means adapted to provide rotatable motion for said tool rotatably mounted on said spindle, means for securing a workpiece in said tool including a face plate carried by the spindle and a plurality of movable jaws radially disposed therein, means for manually moving said jaws to engage said workpiece comprising a hub on said face plate, a scroll plate rotatable and slidably journaled on the hub, a hand wheel member juxtaposed to and engageable with said plate, a plurality of teeth on said movable jaws, a spiral land on said scroll plate engaged with said teeth, means engageable with said scroll plate and arranged to press said land on the scroll plate into more complete mesh with the teeth on said jaw members, means interconnecting the scroll plate to said hand wheel for rotating the scroll plate whereby said scroll plate travels longitudinally over said hub away from said jaw members substantially changing the relationship between said plate and jaw members, said jaw members arranged to move toward the axis of said tool securing the workpiece disposed therein as said hand wheel is turned about the axis of said tool.

20. In a chucking device for holding a workpiece including a spindle, a head portion on one end of said spindle, a scroll plate, chuck jaws in engagement with said scroll plate adapted to secure said workpiece in said chucking device, means for providing rotative motion to said device comprising; a drive member, a cam surface on the drive member, means in engagement with said cam surface and head portion of said spindle providing a coupling between said drive member and spindle and enabling said drive member to rotatably drive said chucking device.

21. In a chucking device for holding a workpiece including a spindle having a head portion on one end, a scroll plate, chuck jaws in engagement with said scroll plate adapted to secure said workpiece, means for providing rotative motion to said device comprising; a drive member rotatably disposed on the spindle and having a cam surface, means slidably journalled in said head portion of said spindle engaging said cam surface to provide coupling means between said drive member and spindle and enabling said drive member to rotatably drive said chucking device.

22. A work holding chuck including a spindle having a head portion on one end, a scroll plate, chuck jaws in engagement with said scroll plate arranged to secure said workpiece, means for providing rotative motion to said device comprising, a drive member rotatably disposed on the spindle and having a cam plate member disposed within a recess therein, said drive member and cam plate being rotatable as a unit on said spindle, a plurality of V-shaped cam surfaces on said cam plate, said cam surfaces being in radial spaced relation about the axis of the spindle, means slidably journalled in said head portion of said spindle having wedge shaped cam surfaces engaging said cam plate surfaces to provide a coupling between said drive member and spindle and enabling said drive member to rotatably drive said spindle.

23. A chuck of the class described including a spindle having a head portion on one end, a scroll plate, chuck jaws in engagement with said scroll plate arranged to secure said workpiece, means provided to aid said scroll plate in moving said jaws and also to provide coupling means to rotatably drive said device comprising, a drive member having at least one cam surface, a bearing member secured to said drive member, said drive member being rotatably journalled on said spindle, a plurality of V-shaped cam surfaces on said drive member in radial spaced relation, means having wedge shaped cam engaging surfaces engaging said cam surfaces disposed in said head portion of said spindle providing coupling means between said drive member and spindle, means in engagement with said drive member and adapted to be moved longitudinally relative to the axis of said device by said cam surfaces whereby said means engages said scroll plate to force said scroll plate into engagement with said jaws and thereby radially move said jaws toward said workpiece.

24. A chucking device as described for holding a workpiece including a spindle having a head portion on one end, a scroll plate rotatably and slidably journalled on said spindle, chuck jaws in engagement with said scroll plate arranged to secure said workpiece in said chucking device, means provided to aid said scroll plate in moving said jaws and also to provide coupling means to rotatably drive said device including a drive member, a cam plate surface on said drive member, said drive member being rotatably journalled on said spindle, at least one V-shaped cam surface on said drive member, means having wedge shaped surfaces engaging said cam surface journalled in said head and abutting said scroll plate and adapted to be moved longitudinally relative to the axis of said device by said cam surfaces whereby said means engages said scroll plate to force said scroll plate into engagement with said jaws and thereby radially move said jaws toward said workpiece.

References Cited in the file of this patent

UNITED STATES PATENTS

| 1,059,234 | Taylor | Apr. 15, 1913 |
| 1,713,799 | Whiton | May 21, 1929 |
| 2,429,524 | Oetzel | Oct. 21, 1947 |